United States Patent [19]

Utsumi

[11] 4,243,848
[45] Jan. 6, 1981

[54] FOCUS CONTROL SYSTEM FOR OPTICAL READ-OUT APPARATUS

[75] Inventor: Yoshihiro Utsumi, Musashino, Japan

[73] Assignee: TEAC Corporation, Tokyo, Japan

[21] Appl. No.: 19,596

[22] Filed: Mar. 12, 1979

[30] Foreign Application Priority Data

Mar. 20, 1978 [JP] Japan .................... 53/32019

[51] Int. Cl.³ .............................. G11B 7/12
[52] U.S. Cl. ........................ 369/45; 250/202; 369/112; 369/124
[58] Field of Search ............ 358/128, 128.5, 128.6, 358/127; 179/100.3 V, 100.1 G; 250/201, 202, 204, 208

[56] References Cited

U.S. PATENT DOCUMENTS

| | | | |
|---|---|---|---|
| 3,932,700 | 1/1976 | Snopko | 358/128 |
| 3,952,191 | 4/1976 | Tinet | 179/100.3 V |
| 3,969,575 | 7/1976 | Gerritsen et al. | 179/100.3 V |
| 4,025,784 | 5/1977 | Lehureau et al. | 358/128 X |
| 4,051,527 | 9/1977 | Braat | 358/128 |
| 4,097,730 | 6/1978 | Korpel | 358/128 X |
| 4,165,519 | 8/1979 | Goto | 179/100.3 V |

Primary Examiner—Bernard Konick
Assistant Examiner—Donald E. McElheny, Jr.
Attorney, Agent, or Firm—Woodcock, Washburn, Kurtz, Mackiewicz & Norris

[57] ABSTRACT

In a video and/or audio disc player wherein a laser beam is focused by an objective on a record disc for scanning same along a spiral information track thereon, a focus control is provided which comprises a converging lens disposed across the path of the information-modulated laser beam. Two or three photodetector elements are disposed on one of the conjugate planes of the converging lens the other of which substantially coincides with a focal plane of the objective. Aligned in the direction in which the successive images of pits on the record disc travel thereover, the photodetector elements produce electrical outputs having a phase relationship representative of the variable distance between record disc and objective. A focus control circuit produces an output signal corresponding to the phase relationship of the outputs from the photodetector elements, for delivery to a drive coil capable of electromagnetically moving the objective toward and away from the record disc for readjustment of the distance therebetween.

5 Claims, 22 Drawing Figures

FOCUS CONTROL SYSTEM FOR OPTICAL READ-OUT APPARATUS

BACKGROUND OF THE INVENTION

1. Field of the Invention

My invention relates to apparatus for optically or optoelectronically reading out information, such as video and/or audio information, recorded along a prescribed track on a record carrier such as that in the form of a disc. More specifically my invention deals with an improved focus control in such apparatus for automatically holding the scanning beam of light focused on the information-bearing surface of the record carrier.

2. Description of the Prior Art

Electronics manufacturers the world over have proposed various forms of optical video and/or audio readout apparatus. Among these is the Philips-MCA video disc player. The principle of this well known video disc player applies also to the readout of audio information by the pulse code modulation (PCM) scheme. The record disc for use with such video and/or audio disc players bears information in the form of a succession of short grooves or "pits" arranged along a multiturn spiral track.

Usually, for the readout of the information, the disc player has an optical pickup assembly comprising a light source such as a helium-neon (He-Ne) laser or semiconductor laser, an objective or collector lens for focusing the laser beam on the record disc, and a photodetector for translating into an electrical signal the information-modulated laser beam that has been reflected from the record disc. The rotation of the record disc and the linear motion of the pickup assembly in the radial direction of the record disc enable in combination the scanning laser beam to follow the spiral track on the record disc.

The disc player further includes a focus control for holding the scanning laser beam focused on the record disc. Were it not for the focus control, it would be practically impossible to maintain a constant distance between record disc and objective throughout the course of information readout, because the disc is never perfectly flat.

According to a well known example of focus control system, the laser beam is split into a readout sub-beam and a focus control sub-beam. The focus control sub-beam impinges on the record disc at an angle to its surface and, on reflection therefrom, irradiates a split photodetector consisting essentially of a pair of photodetector elements in close juxtaposition. The boundary between the pair of photodetector elements exactly bisects the spot of the reflected focus control sub-beam falling thereon when the readout sub-beam is focused on the record disc. Thus, as long as the correct distance exists between record disc and objective, the photodetector elements produce electrical outputs of equal magnitude. The output magnitude of either photodetector element becomes greater, and that of the other becomes smaller, when the disc-to-objective distance either increases or decreases from its correct value.

The objective is usually suspended in springs and coupled to a drive coil in a radial magnetic field. The drive coil moves with the objective toward and away from the record disc in response to an energizing current corresponding to the difference between the output magnitudes of the photodetector elements. The objective thus refocuses the readout sub-beam on the record disc.

An objection to this prior art focus control system is that it requires the use of a sub-beam exclusively for focus control, making the disc player unnecessarily complex and expensive of manufacture. Moreover, as changes in ambient temperature put the optical system of the apparatus out of order, the reflected focus control sub-beam may not fall on the split photodetector at the exact boundary between its two component elements even though the readout sub-beam is focused on the record disc. This of course will result in the forced defocusing of the readout sub-beam.

I am aware of several proposed systems that dispense with a focus control sub-beam. Such advanced systems rely on the intensity or spot diameter of the reflected readout beam for detection of the distance between record carrier and objective. My invention also attains the objective of focus control without use of a focus control sub-beam, but through a completely different approach.

SUMMARY OF THE INVENTION

It is an object of my invention to provide optical readout apparatus including simplified but efficient means for automatically focusing the readout beam of light on the record carrier.

Another object of my invention is to provide a focus control system which is readily adaptable for use with various types of readout apparatus and with various types of record carriers.

A further object of my invention is to provide a focus control system which can be readily incorporated in existing readout apparatus, notably disc players, without any substantial alteration of their construction and, if desired, so as to permit the use of some of its constituent parts both for focus control and information readout.

Stated in its perhaps broadest aspect, my invention resides in apparatus for reading a record carrier bearing information in the form of a succession of optically readable regions extending along a predetermined track thereon. The apparatus includes means for causing a scanning or readout beam of light, focused on the record carrier by an objective, to follow the spiral track and hence to be modulated by the information recorded thereon. At least two photodetector elements are disposed in selected positions to be irradiated by the information-modulated light beam that either has been reflected from or has passed through the record carrier. The photodetector elements are aligned substantially in the direction in which the successive images of the optically readable regions on the record carrier travel thereover, so that the electrical outputs from these elements have a phase relationship varying in step with the variable distance between record carrier and objective. Also included is a focus control circuit for producing a focus control signal corresponding to the phase relationship of the outputs from the photodetector elements. This focus control signal is utilized for the readjustment of the distance between record carrier and objective.

Preferably, and if space allows, the photodetector elements may be disposed on a focal plane of the objective, so as to be irradiated by the information-modulated light beam that has been reflected from the record carrier and which has passed back through the objective. If no such space exists, then a converging lens may be employed to provide a plane in conjugate relationship to the focal plane of the objective, and the photodetector elements may be disposed on that plane.

No distinct images of the optically readable regions (e.g., the pits in the case of a record disc) on the record carrier fall on the photodetector elements when the readout beam is sharply focused on the record carrier. The electrical outputs produced then by the photodetector elements are in phase with each other. The distinct images of the optically readable regions pass successively over the photodetector elements in one direction when the record carrier is displaced toward the objective, and in the opposite direction when the record carrier is displaced away from the objective. In these cases the outputs from the photodetector elements have phase differences corresponding to the degrees of displacement of the record carrier toward or away from the objective.

It is thus possible to ascertain the actual distance between record carrier and objective from the modulated readout beam itself. This simplifies the optical system of the apparatus. Further the accurate detection of the carrier-to-objective distance is possible even if the optical system goes out of order through changes in ambient temperature.

A further feature of my invention resides in the fact that it permits the desired information to be derived from the output from one of the photodetector elements. This also helps to simplify the construction the apparatus, as it requires no photodetector exclusively for information readout.

According to a still further feature of my invention, the focus control circuit has an automatic cutoff switch connected in its output line. Normally closed, the cutoff switch automatically opens when the record carrier is displaced to such an extent as to give rise to a "pseudofocused condition" to be explained later. The cutoff switch thus functions to prevent the delivery of the focus control signal when the phase relationship of the outputs from the photodetector elements does not represent the actual distance between record carrier and objective.

The above and other objects, features and advantages of my invention and the manner of attaining them will become more clearly apparent, and the invention itself will best be understood, from the following description and appended claims taken in connection with the accompanying drawings showing some preferable embodiments of my invention.

DESCRIPTION OF THE PREFERRED EMBODIMENTS

Figure 1:
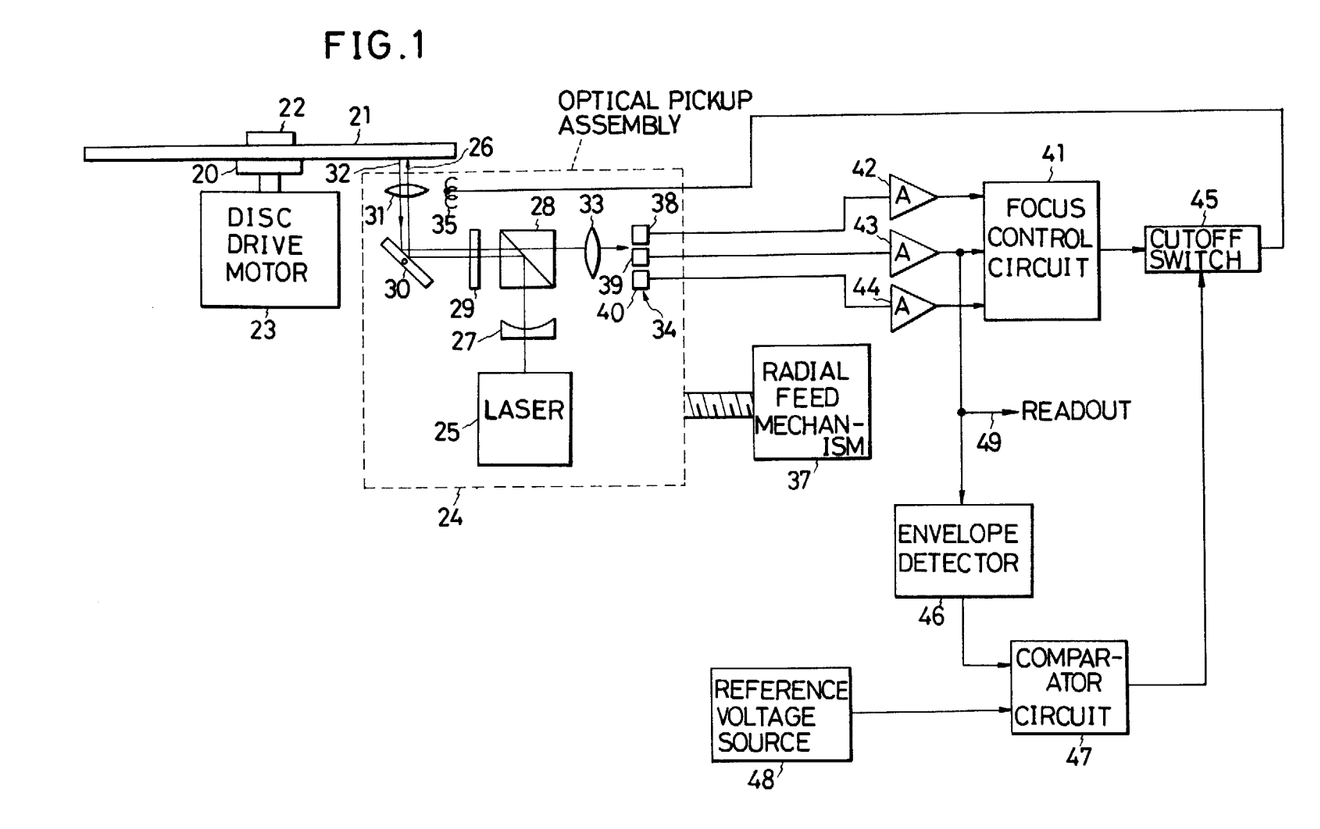
FIG. 1 is a diagrammatic representation, partly in block form, of an example of optical readout apparatus incorporating a preferred form of the focus control system in accordance with my invention, the exemplified apparatus being of the type for use with a record disc that reflects the readout beam of light in modulating same with the information recorded thereon.

FIG. 1 shows the focus control system of my invention as adapted for apparatus for reading a disclike record carrier. The following description of FIG. 1 will deal principally with the general organization of the apparatus and give only the broad outline of the focus control system. Full description of the focus control system will later appear in connection with the subsequent figures.

Commonly known as the video or audio disc player, the apparatus of FIG. 1 includes a turntable 20 having a record disc 21 mounted thereon. The record disc 21 has video or audio information recorded thereon in the form of a succession of pits along a multiturn spiral track, as will be presently described in more detail with reference to FIGS. 2 and 3. A clamp 22 on the center spindle, not shown, of the turntable 20 retains the record disc 21 against angular displacement relative to the turntable. The record disc 21 is greater in diameter than the turntable 20, to such an extent that the entire information-bearing surface portion of the record disc lies beyond the perimeter of the turntable. A disc drive motor 23 has its output shaft coupled to the turntable 20 for driving same, and therefore the record disc 21 thereon, at a preset speed of, usually, 1800 revolutions per minute.

The reference numeral 24 generally designates an optical pickup assembly for reading out the information recorded on the record disc 21. Disposed under the record disc 21, the optical pickup assembly 24 travels in its radial direction, at a speed corresponding to that of the rotation of the turntable 20, and so scans the spiral information track on the record disc.

The optical pickup assembly 24 includes a light source 25, usually a laser and preferably a He-Ne laser, for emitting a scanning beam 26. Lying in the path of the laser beam from the laser 25 to the record disc 21 are a diverging lens 27, a beam splitter 28, a quarter-wave plate 29, a tracking mirror 30, and an objective or collector lens 31, in the order of recitation. All these members also form parts of the optical pickup assembly.

Shown as a planoconcave lens, the diverging lens 27 serves to diverge the laser beam as the latter reaches the beam splitter 28. This beam splitter functions in association with the quarter-wave plate 29 to separate the incident laser beam from that reflected from the record disc 21, by reflecting the incident beam and transmitting the reflected beam. The reflected laser beam has of course be modulated by the information on the record disc 21. This reflected beam is designated 32 in contradistinction to the incident, unmodulated laser beam 26.

The tracking mirror 30 is arranged to deflect both incident 26 and reflected 32 beams through an angle of approximately 90 degrees. Medially pivoted, moreover, the tracking mirror 30 operates in the well known manner to shift the incident beam 26 in the radial direction of the record disc 21, in order to hold the beam centered on the information track thereon. The objective 31 has its axis oriented normal to the plane of the record disc 21 and serves to focus the incident readout beam 26 on the surface of the disc.

Additionally the optical pickup assembly 24 comprises a double convex or like converging lens 33 and a photodetector assembly 34. The converging lens 33 passes the reflected beam 32 that has been separated from the incident beam 26 by the beam splitter 28. Optically aligned with the objective 31, the converging lens 33 serves to provide a plane substantially in conjugate relationship to a focal plane of the objective. The photodetector assembly 34 lies on this plane of the converging lens 33 for deriving the information from the reflected beam 32 falling thereon and for providing signals required for focus control. Thus, on reflection from the record disc 21, the information-modulated beam 32 impinges on the photodetector assembly 34 via the objective 31, the tracking mirror 30, the quarter-wave plate 29, the beam splitter 28, and the converging lens 33.

At 35 is shown a drive coil operatively coupled to the objective 31. Energized with a focus control signal derived from the outputs from the photodetector assembly 34, the drive coil 35 functions to move the objective 31 toward and away from the record disc 21 so as to keep the former focused on the latter, much like the voice coil of a loudspeaker. The objective 31, the drive coil 35 and some other associated parts constitute in combination an objective assembly 36, FIG. 4, which will be detailed later.

The complete optical pickup assembly 24 of the foregoing configuration is mounted on a suitable carriage, not shown, which is coupled to a radial feed mechanism 37. As the name implies, this mechanism 37 operates to feed the optical pickup assembly 24 radially of the record disc 21, in step with the rotation of the latter. It will of course be seen that the tracking mirror 30 and objective 31 move, in their respective ways aforementioned, with respect to the unshown carriage of the optical pickup assembly 24.

The photodetector assembly 34 comprises first 38, second 39 and third 40 photodetector elements in juxtaposition. The light sensitive surfaces of the three photodetector elements 38, 39 and 40 lie in the aforesaid plane in conjugate relationship to a focal plane of the objective 31 and thus constantly receive the reflected beam 32 from the converging lens 33. These photodetector elements are further aligned in a direction approximately in agreement with the direction in which the images of the successive pits in the record disc 21 travel within the spot of the reflected beam 32 falling thereon. Constant spacings exist between the photodetector elements in this particular embodiment.

The outputs of the first 38, second 39 and third 40 photodetector elements are all electrically connected to a focus control circuit 41 via first 42, second 43 and third 44 amplifiers, respectively. The focus control circuit 41 produces the aforesaid focus control signal in response to the amplified outputs from the photodetector elements 38, 39 and 40. The output of the focus control circuit 41 is connected to the drive coil 35 of the objective assembly 36 via an automatic cutoff switch 45.

It is the function of the automatic cutoff switch 45 to temporarily interrupt the delivery of the focus control signal from the focus control circuit 41 to the drive coil 35 when what is herein termed the pseudofocused condition occurs or is about to occur. The pseudofocused condition takes place when the distinct images of the pits in the record disc 21 fall on all the three photodetector elements 38, 39 and 40 while the record disc 21 is out of focus, as will become clearer as the description proceeds.

Forming a part of a circuit for actuation of the cutoff switch 45, an envelope detector 46 is connected to the output of the second amplifier 43 for sensing variations in its output level. The envelope detector 46 puts out a signal corresponding to the envelope of the high frequency output from the second photodetector element 39. The envelope detector 46 has its output connected to one of the two inputs of a comparator circuit 47. A reference voltage source 48 is connected to the other input of the comparator circuit 47.

The comparator circuit 47 thus effects constant comparison of the envelope detector output with a predetermined reference voltage from the source 48. In this particular embodiment the comparator circuit 47 puts out a switch actuator signal when the envelope detector output voltage becomes lower than the reference voltage. Thus, when the pseudofocused condition takes place or is about to take place, the switch actuator signal from the comparator circuit 47 opens the cutoff switch 45 thereby causing same to intercept the delivery of the focus control signal from the focus control circuit 41 to the drive coil 35.

A readout line 49 further branches from the output line of the second amplifier 43 for connection to the usual demodulator circuit, not shown, of the disc player. This readout line serves to deliver to the unshown demodulator circuit the desired video or audio information that has been derived from the reflected beam 32 by the second photodetector element 39.

Figure 2:
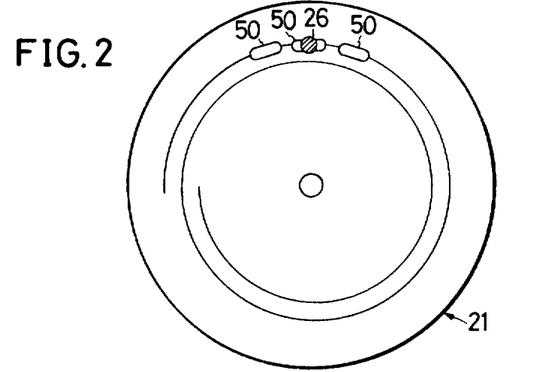
FIG. 2 is a schematic plan view of the record disc for use with the apparatus of FIG. 1, the view showing for simplicity only a few of the numerous pits inscribed on the record disc along a spiral track, with the few representative pits being shown greatly exaggerated with respect to the record disc itself, the view also showing the spot of the readout beam falling on the record disc, in size corresponding to the size of the pits.

As will be seen from its plan view given in FIG. 2, the record disc 21 for use with the disc player of FIG. 1 has the video or audio information recorded thereon in the form of successive pits 50 along a spiral track. These pits 50 have each a width of about one micron and a depth of about $\frac{1}{4}\lambda$ micron (where $\lambda$ is the wavelength of the laser beam in use). The length of each pit 50 ranges from about 1.5 to six microns, depending upon the particular location of the pit in the radial direction of the record disc.

Figure 3:
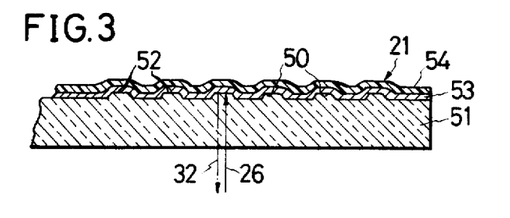
FIG. 3 is an enlarged, fragmentary, radial sectional view of the record disc of FIG. 2.

FIG. 3 cross-sectionally represents a typical construction of the record disc 21. The typified record disc includes a relatively thick layer 51 of a transparent synthetic resin having formed on one of its surfaces a succession of islands 52 corresponding to the desired pits 50 to be formed. A layer or film 53 of reflective material overlies the island carrying surface of the transparent layer 51, and another layer or film 54 of suitable material further overlies the reflective layer 53 for protection. The desired pits 50 are thus formed in the reflective layer 53. The incident laser beam 26 irradiates the reflective layer 53 via the transparent layer 51 and is reflected back through the transparent layer as the modulated beam 32.

As represented explanatorily in FIG. 2, the spot of the incident readout beam 26 on the record disc 21 has a diameter in excess of the width of each pit 50. Thus, when the beam scans each pit 50, a mutual interference occurs between the light reflected from the pit and that reflected from the smooth surface portions adjoining the pit. The result is a decrease in the intensity of the reflected beam 32. No such interference takes place when the beam is scanning the smooth surface portions between the successive pits 50. The pits thus modulate the intensity of the reflected beam 32 and, therefore, the corresponding electrical outputs from the photodetector elements 38, 39 and 40.

Figure 4:
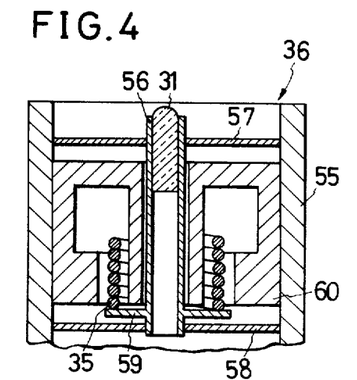
FIG. 4 is an enlarged, axial sectional view of the objective assembly used in the apparatus of FIG. 1.

Attention is now called to the details of the objective assembly 36 given in FIG. 4. The objective assembly includes a housing 55 in the form of a hollow cylinder. A tubular objective holder 56 securely holding the objective 31 is disposed concentrically within the housing 55 and connected thereto via a pair of axially spaced, disclike springs 57 and 58. This spring suspension of the objective 31 permits the latter to move axially relative to the housing 55 within limits.

The objective assembly 36 further comprises the drive coil 35 disposed concentric with the objective holder 56 and bracketed at 59 thereto. The drive coil 35 lies in the radial magnetic field of a permanent magnet 60 also fixedly mounted within the housing 55. Thus, upon delivery of the focus control signal from the focus control circuit 41 to the drive coil 35, the objective 31 together with its holder 56 moves axially toward and away from the record disc 21, in much the same way as the diaphragm of a moving-coil loudspeaker.

Figure 5:
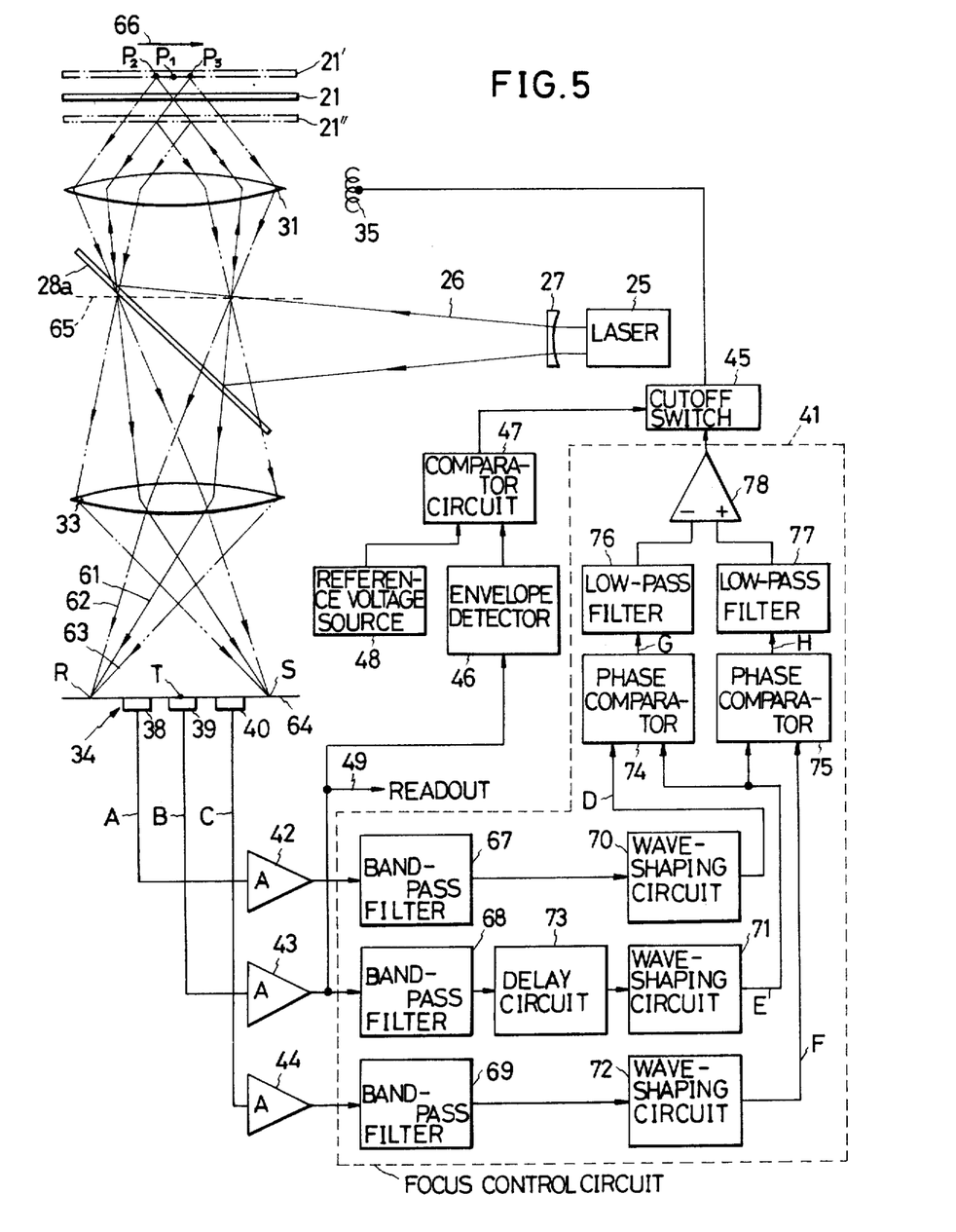
FIG. 5 is a diagrammatic representation, partly in block form, showing in greater detail the focus control system incorporated in the apparatus of FIG. 1, only with the optical pickup assembly of the apparatus being shown simplified to clearly illustrate the operation of the focus control system with the varying positions of the record disc with respect to the objective focusing the readout beam thereon.

FIG. 5 is a more detailed diagram of the disc player of FIG. 1, particularly of its focus control system. For clarity in the representation of the incident and reflected laser beams, however, this figure does not show the quarter-wave plate 29 and tracking mirror 30 and does show a half-silvered mirror 28a in lieu of the beam splitter 28. The figure details the variations in the path of the reflected or modulated laser beam that have been caused by variations in the distance between record disc 21 and objective 31. Also shown are the details of the focus control circuit 41.

During the operation of the disc player the objective 31 may be either focused or unfocused on the record disc 21. In the latter case, moreover, the record disc may lie either too close to or too far away from the objective. FIG. 5 depicts three such possible positions of the record disc relative to the objective during the operation of the apparatus.

The objective 31 is focused on the record disc when the latter is in the solid line position labeled 21. The arrows 61 represent the path of the laser beam reflected from the record disc to the photodetector assembly 34 when the record disc is in this proper position. When the record disc has moved away from the focus of the objective 31 to a distal position 21', the laser beam on reflection from the disc follows the path 62 to the photodetector assembly 34. Likewise, when the record disc has moved out of the focus of the objective 31 to a proximal position 21", the reflected laser beam follows the path 63 to the photodetector assembly 34.

As has been mentioned, the light sensitive surfaces of the three elements 38, 39 and 40 of the photodetector assembly 34 lie in the common plane designated 64 in FIG. 5. This plane 64 is one of the conjugate planes of the converging lens 33 the other of which agrees with the focal plane 65 of the objective 31 away from the record disc 21. Optically, therefore, the light sensitive surfaces of the photodetector assembly 34 can be thought of as lying in the focal plane 65 of the objective 31.

The incident laser beam is focused at or about a fixed point P1 on the record disc 21, which is traveling (rotating) in the arrow marked direction 66, when the disc is properly located in the solid line position. On reflection from the record disc 21 the laser beam travels along the path 61 and falls on the three photodetector elements 38, 39 and 40 on the plane 64.

Upon displacement of the record disc to the distal position 21' the spot of the incident laser beam on the disc becomes sufficiently great in diameter to encompass its surface portion extending from point P2 to point P3, as measured substantially in the traveling direction 66 of the disc. Reflected from this distally displaced record disc, the laser beam follows the path 62 and forms the image of the disc surface portion on the plane 64 of the photodetector assembly 34. The point P2 on the distally displaced record disc is imaged at a point S on the plane 64, which point lies beyond the third photodetector element 40. The point P3 on the distally displaced record disc is imaged at a point R on the plane 64, which point lies beyond the first photodetector element 38.

Upon displacement of the record disc to the proximal position 21" the spot of the incident laser beam on the disc also becomes sufficiently great in diameter to cover its surface portion extending from point P2 to point P3. Reflected from the proximally displaced record disc, the laser beam follows the path 63 to the photodetector assembly 34 and forms the image of the noted disc surface portion on the plane 64. In this case the point P2 on the proximally displaced record disc is imaged at the point R on the plane 64, and the point P3 on the disc is imaged at the point S on the plane 64.

It is thus seen that the record disc images of different character fall on the plane 64 depending upon whether the objective 31 is focused or unfocused on the record disc and, further, upon whether the record disc is displaced toward or away from the objective. The spot of the reflected laser beam on the plane 64 remains approximately constant in diameter, however, in spite of the varying position of the record disc relative to the objective. This is because, as aforesaid, the plane 64 is in conjugate relationship to the focal plane 65 of the objective. Thus, during the operation of the disc player, the reflected laser beam constantly irradiates all the three elements 38, 39 and 40 of the photodetector assembly 34.

The three photodetector elements 38, 39 and 40 could be disposed with their light sensitive surfaces in the focal plane 65 of the objective 31, only if space allowed. No such space usually exists in the disc players of the type under consideration. It is therefore more practical and convenient to provide the converging lens 33 and to arrange the photodetector elements on the plane 64 in conjugate relationship to the focal plane 65 of the objective 31.

Constantly irradiated as above by the laser beam reflected from the record disc 21, the three photodetector elements 38, 39 and 40 deliver their electrical outputs to the focus control circuit 41 via the respective amplifiers 42, 43 and 44. These outputs from the photodetector elements have a phase relationship varying in step with the variable distance between record disc and objective, as will become apparent from the subsequent description of operation. The focus control circuit 41 functions to generate the focus control signal, for delivery to the drive coil 35 of the objective assembly 36, which has been derived from the variable phase relationship of the outputs from the photodetector elements 38, 39 and 40.

The focus control circuit 41 includes first 67, second 68 and third 69 band-pass filters connected directly to the outputs of the respective amplifiers 42, 43 and 44. These bandpass filters 67, 68 and 69 transmit only the desired high frequency information signals representing the scanned pits 50 on the record disc.

The band-pass filters 67, 68 and 69 have their outputs connected to first 70, second 71 and third 72 wave-shaping circuits, respectively. Although the first 67 and third 69 band-pass filters are connected directly to the first 70 and third 72 wave-shaping circuits, the second band-pass filter 68 is connected to the second wave-shaping circuit 71 via a time-delay circuit 73.

The time-delay circuit 73 serves to delay the output from the second photodetector element 39 for a preset length of time, such that the outputs from the three wave-shaping circuits 70, 71 and 72 will have a phase relationship suitable for the formation of the desired focus control signal. The delaying of the output from the second photodetector element is necessary because the three photodetector elements 38, 39 and 40 have constant spacings therebetween in this particular embodiment, as will be better understood as the description proceeds.

The time-delay circuit 73 may not necessarily be connected between the second band-pass filter 68 and second wave-shaping circuit 71. It may be connected either in the preceding stage of the band-pass filter or in the succeeding stage of the wave-shaping circuit.

The wave-shaping circuits 70, 71 and 72 function to limit the input amplitudes and to produce outputs of substantially rectangular waveform. The first 70 and second 71 wave-shaping circuits are connected to the two inputs, respectively, of a first phase comparator 74. The second 71 and third 72 wave-shaping circuits are connected to the two inputs, respectively, of a second phase comparator 75.

Each of the phase comparators 74 and 75 takes the form of an exclusive OR circuit. If desired, however, each phase comparator may be composed of any such device as an AND gate, product detector, or choppertype phase comparator.

The phase comparators 74 and 75 have their outputs connected to first 76 and second 77 low-pass filters, respectively, which are designed to provide smoothed outputs. These low-pass filters 76 and 77 are connected to the two inputs, respectively, of a differential amplifier 78. This differential amplifier produces the focus control signal corresponding to the difference between the outputs from the low-pass filters 76 and 77, for delivery to the drive coil 35 of the objective assembly 36 via the automatic cutoff switch 45.

Operation

Figure 6A:
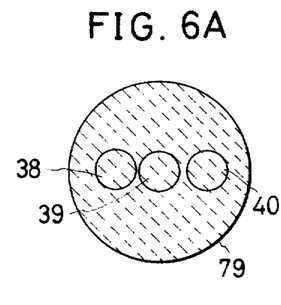
FIG. 6A is a diagrammatic view of the spot of the information-modulated beam falling on the three coplanar photodetector elements in the focus control system of FIGS. 1 and 5 when the objective is focused on the record disc.
Figure 6B:
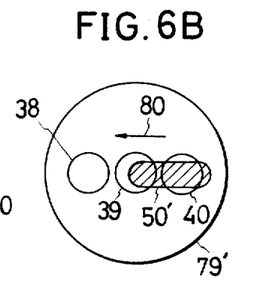
FIG. 6B is a similar view of the spot of the information-modulated beam falling on the photodetector elements when the record disc is displaced away from the objective.
Figure 6C:
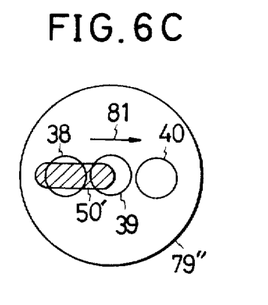
FIG. 6C is a similar view of the spot of the information-modulated beam falling on the photodetector elements when the record disc is displaced toward the objective.

What follows is the operational description of the focus control system of FIGS. 1 and 5. FIGS. 6A, 6B and 6C represent the images 79, 79' and 79" formed on the plane 64 of the photodetector elements 38, 39 and 40 by the laser beam reflected from the record disc when the latter is in the noted three possible positions 21, 21' and 21" relative to the objective 31. The diameter of the reflected laser beam spot on the plane 64 remains constant, as aforesaid, regardless of the varying position of the record disc relative to the objective.

Figure 8:
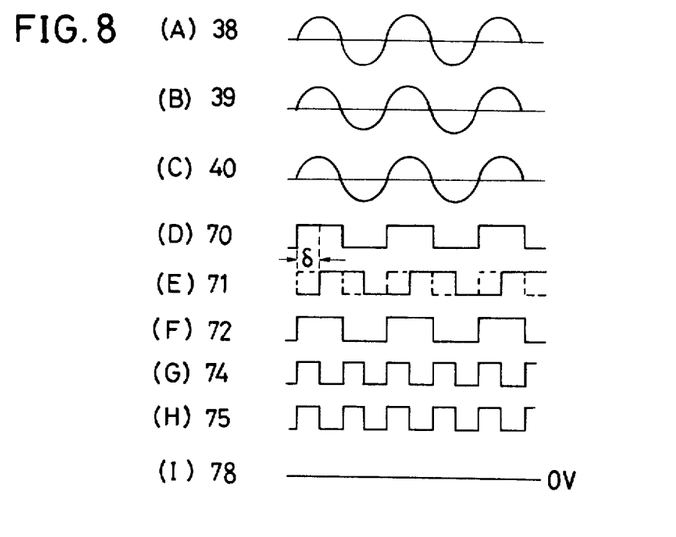
FIG. 8, including 8A–8I, is a chart of waveforms appearing at various stages in the focus control system of FIG. 5 when the objective is focused on the record disc.

More specifically FIG. 6A represents the record disc image 79 when the disc lies in its proper position 21 of FIG. 5, with the objective 31 correctly focused thereon. In this condition the intensity of the reflected laser beam becomes high when the incident beam scans each pit in the record disc, and becomes low when the incident beam scans the flat surface portion between any two adjacent pits. Since the incident laser beam is then sharply focused on the record disc, the reflected beam of high or low intensity irradiates all the three elements 38, 39 and 40 of the photodetector assembly 34. The successive pits being scanned do not appear as such in the image 79 on the plane 64. FIGS. 8A, 8B and 8C plot the waveforms of the electrical outputs generated then by the three photodetector elements 38, 39 and 40, respectively. It should be noted that all these outputs are in phase with each other.

FIG. 6B illustrates the record disc image 79' on the plane 64 when the disc is displaced to the distal position 21' of FIG. 5, away from the focal plane of the objective 31. Since then the incident laser beam irradiates a larger area on the record disc, the successive pits being scanned appear as such in the image 79'. FIG. 6B shows one of such successive distinct pit images at 50'. The successive pit images 50' manifest themselves as regions of lower beam intensity, observable as dark regions against light background that represents the neighboring flat surface area of the record disc. If the record disc is traveling (rotating) in the direction of the arrow 66 in FIG. 5, then the successive pit images 50' travel in the direction of the arrow 80 in FIG. 6B.

Figure 7A:
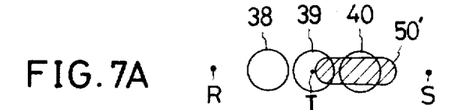
FIGS. 7A, 7B and 7C are a series of diagrammatic views explanatory of the movement of each of the successive distinct pit images over the photodetector elements when the record disc is displaced away from the objective.
Figure 7B:
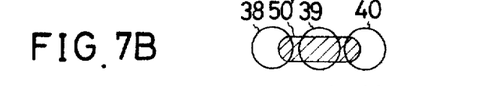
Figure 7C:
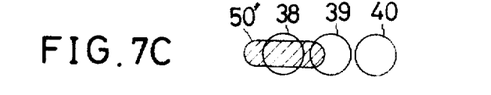

FIGS. 7A, 7B and 7C sequentially illustrate such travel of each pit image 50' over the three photodetector elements 38, 39 and 40. Let it now be assumed that at some instant in time, one of the pits 50 in the record disc 21 lies at the point P2 in FIG. 5. This particular pit is imaged at the point S on the plane 64. FIG. 7A shows the particular pit image as being formed over the third photodetector element 40 and part of the second photodetector element 39.

Upon movement of the pit in question to the point P1 with the rotation of the distally displaced record disc, its image also travels to a point T, FIG. 5, intermediate the points R and S on the plane 64. As shown in FIG. 7B, the pit image at this point T falls mostly on the second photodetector element 39 and partly on the first 38 and third 40 photodetector elements.

Upon movement of the pit in question to the point P3 with the continued rotation of the distally displaced record disc, its image travels to the point R on the plane 64. As seen in FIG. 7C, the pit image at the point R falls mostly on the first photodetector element 38 and partly on the second photodetector element 39.

Figure 9:
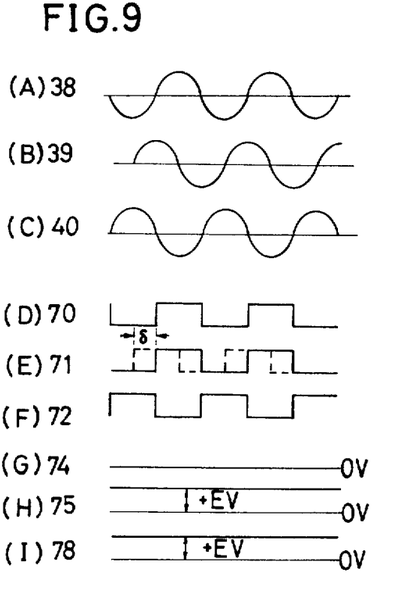
FIG. 9, including 9A–9I, is a chart of waveforms appearing at various stages in thè focus control system of FIG. 5 when the record disc is displaced away from the objective.

FIGS. 9A, 9B and 9C plot the waveforms of the electrical outputs generated by the three photodetector elements 38, 39 and 40, respectively, when the successive distinct pit images 50' travel thereover in the above described manner, with the record disc held in the distally displaced position 21'. These photodetector outputs are out of phase with each other, unlike those (FIGS. 8A, 8B and 8C) generated when the record disc lies in the focal plane of the objective 31. The greater the distance is between the actual position of the record disc and the focal plane of the objective, the less will be the traveling speed of the successive pit images 50' on the plane 64.

FIG. 6C represents the record disc image 79" on the plane 64 when the disc is displaced to the proximal position 21" of FIG. 5, also out of the focal plane of the objective 31. In this case, too, the incident laser beam irradiates a comparatively large area on the record disc, so that the distinct images 50' of the successive pits being scanned fall on the photodetector elements 38, 39 and 40.

The successive pit images 50' travel in the direction of the arrow 81, however, which is opposite to the traveling direction 80 of the pit images given in FIG. 6B. The reason for this will be apparent from the description made previously of FIG. 5.

Figure 10:
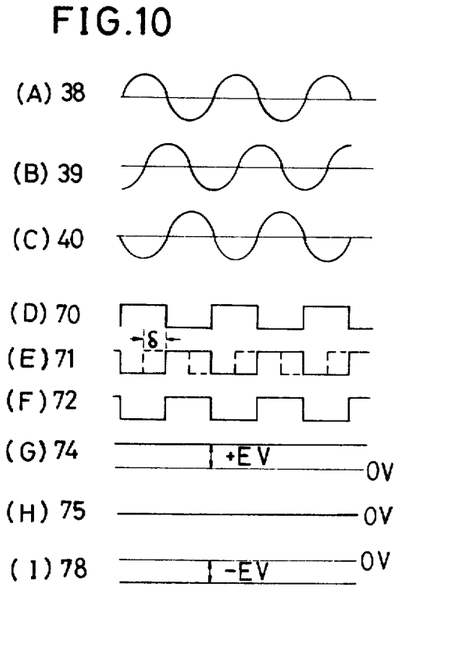
FIG. 10, including 10A–10I, is a chart of waveforms appearing at various stages in the focus control system of FIG. 5 when the record disc is displaced toward the objective.

FIGS. 10A, 10B and 10C are waveform diagrams of the outputs produced in this case by the photodetector elements 38, 39 and 40, respectively. These photodetector outputs are also out of phase with each other, and their phases bear an inverse relationship to those of the corresponding photodetector outputs of FIGS. 9A, 9B and 9C.

Subsequently amplified by the amplifiers 42, 43 and 44, the outputs from the photodetector elements 38, 39 and 40 pass on to the band-pass filters 67, 68 and 69 and thence to the wave-shaping circuits 70, 71 and 72. The output from the second photodetector element 39, however, passes the time-delay circuit 73 on its way from the second band-pass filter 68 to the second wave-shaping circuit 71. The time-delay circuit 73 delays the second photodetector element output for a time $\delta$ corresponding to a phase angle of 90 degrees with respect to the average frequency of the AC outputs from the photodetector elements 38, 39 and 40.

FIGS. 8D, 8E and 8F plot the waveforms of the outputs produced by the wave-shaping circuits 70, 71 and 72, respectively, when the objective 31 is correctly focused on the record disc 21. In this condition the outputs from the photodetector elements 38, 39 and 40 are all in phase with each other as in FIGS. 8A, 8B and 8C. Because of the presence of the time-delay circuit 73 in its preceding stage, however, the second wave-shaping circuit 71 produces the output 90 degrees out of phase with the outputs from the first 70 and third 72 wave-shaping circuits.

The first 70 and second 71 wave-shaping circuits deliver their outputs of FIGS. 8D and 8E to the first phase comparator 74. Also the second 71 and third 72 wave-shaping circuits deliver their outputs of FIGS. 8E and 8F to the second phase comparator 75.

The phase comparators 74 and 75 are assumed to be both in the form of exclusive OR circuits. Thus the first phase comparator 74 produces the output of FIG. 8G, which represents the phase difference between the first wave-shaping circuit output of FIG. 8D and the delayed second wave-shaping circuit output of FIG. 8E. The second phase comparator 75 produces the output of FIG. 8H, which represents the phase difference between the delayed second wave-shaping circuit output of FIG. 8E and the third wave-shaping circuit output of FIG. 8F.

Since the phase difference between the waveforms of FIGS. 8D and 8E is equal to the phase difference between the waveforms of FIGS. 8E and 8F, the outputs from the first 74 and second 75 phase comparators are identical. These outputs from the phase comparators are delivered to the respective low-pass filters 76 and 77 and thence to the differential amplifier 78. The two inputs to the differential amplifier 78 are of course identical, so that the output from the differential amplifier is zero as in FIG. 8I.

Thus, as long as the record disc stays at the focus of the objective 31, the focus control circuit 41 does not energize the drive coil 35 of the objective assembly 36.

Consequently the objective 31 remains focused on the record disc.

When the record disc is displaced to the distal position 21' of FIG. 5, a phase difference of 90 degrees exists between the outputs of FIGS. 9A and 9B from the first 38 and second 39 photodetector elements and between the outputs of FIGS. 9B and 9C from the second 39 and third 40 photodetector elements. The time-delay circuit 73 delays the phase of the output from the second photodetector elements 39 and another 90 degrees. The outputs from the three wave-shaping circuits 70, 71 and 72 are therefore as represented in FIGS. 9D, 9E and 9F, respectively.

The outputs of FIGS. 9D and 9E from the first 70 and second 71 wave-shaping circuits are in phase with each other. Since these outputs are both delivered to the first phase comparator 74, the latter produces no output voltage as in FIG. 9G. The outputs of FIGS. 9E and 9F from the second 71 and third 72 wave-shaping circuits are 180 degrees out of phase with each other. Receiving these outputs from the second and third wave-shaping circuits, the second phase comparator 75 produces an output voltage of, for example, +E volt(s) as in FIG. 9H. Consequently, in this particular embodiment, the differential amplifier 78 produces the focus control signal of +E volt(s) as in FIG. 9I.

The +E volt focus control signal is delivered to the drive coil 35 of the objective assembly 36 via the automatic cutoff switch 45, which is closed during the normal control operation of the focus control system. The current through the drive coil 35 interacts with the magnetic field of the permanent magnet 60 in the well known manner, causing the coil and the objective 31 to move toward the distally displaced record disc in opposition to the influence of the disclike springs 57 and 58. The objective is thus refocused on the record disc.

When the record disc is displaced to the proximal position 21" of FIG. 5, a phase difference of 90 degrees also exists between the outputs of FIGS. 10A and 10B from the first 38 and second 39 photodetector elements and between the outputs of FIGS. 10B and 10C from the second 39 and third 40 photodetector elements. These output waveforms are, however, in inverse phase relationship to the output waveforms of FIGS. 9A, 9B and 9C. The time-delay circuit 73 delays the phase of the output from the second photodetector element 39 by 90 degrees. Thus the wave-shaping circuits 70, 71 and 72 produce the outputs given in FIGS. 10D, 10E and 10F, respectively.

The outputs of FIGS. 10D and 10E from the first 70 and second 71 wave-shaping circuits are 180 degrees out of phase with each other, so that the first phase comparator 74 produces an output voltage of, for example, +E volt(s) as in FIG. 10G. The outputs of FIGS. 10E and 10F from the second 71 and third 72 wave-shaping circuits are in phase with each other, so that the second phase comparator 75 produces no output voltage as in FIG. 10H. The focus control signal produced by the differential amplifier 78, therefore, has a voltage of −E volt(s) as in FIG. 10I.

This −E volt focus control signal is delivered as above to the drive coil 35 of the objective assembly 36 via the closed cutoff switch 45. The objective 31 is then moved away from the proximally displaced record disc, to an extent necessary to refocus the incident laser beam on the record disc.

As will have been clearly understood from the foregoing, the focus control system of FIG. 5 operates automatically to readjust the position of the objective 31 so as to hold same at a required distance from the record disc 21, either when the latter is displaced toward or away from the objective. The focus control system senses the degree of displacement of the record disc in either direction from the traveling velocity and size of the successive pit images 50' falling on the three photodetector elements 38, 39 and 40. Representing the thus sensed degree of record disc displacement, the focus control signal causes the objective assembly to refocus the incident laser beam on the record disc in spite of its displacement in either of the opposite directions and to varying degrees in each direction.

In the use of this focus control system two or more distinct pit images may pass simultaneously over the photodetector elements 38, 39 and 40 when the record disc is out of the focus of the objective. Should the successive distinct pit images fall simultaneously on all the three photodetector elements, the electrical outputs therefrom will be substantially in phase with each other. The focus control circuit 41 will respond to these outputs just as it does to those (FIGS. 8A, 8B and 8C) which the photodetector elements produce when the record disc is in focus. Thus, even though the record disc is actually out of focus, the focus control circuit will not produce the focus control signal of the magnitude required for refocusing the objective. This is what I call the pseudofocused condition.

My invention provides for this pseudofocused condition, by connecting the automatic cutoff switch 45 in the output line of the focus control circuit 41. The cutoff switch 45 automatically opens the servo loop of the focus control system when the pseudofocused condition takes place or is about to take place. Further the cutoff switch automatically recloses the servo loop when the pseudofocused condition, or the possibility of it taking place, disappears. The following description will make this automatic cutoff operation clearer.

With reference to FIG. 5 the envelope detector 46 connected to the output of the second amplifier 43 produces an output representative of the output level or amplitude of the second photodetector element 39. The magnitude of this output from the envelope detector 46 is the highest when the record disc lies in the focus of the objective 31. The farther the record disc moves away from the focus of the objective in either direction, the less will be the magnitude of the output from the envelope detector 46.

As will be apparent from the above definition of the pseudofocused condition, this condition occurs upon displacement of the record disc away from the focus of the objective to a certain specifiable degree in either direction. The output magnitude of the envelope detector 46 may therefore be constantly compared against a certain reference value that represents the degree of record disc displacement at or beyond which the pseudofocused condition will take place or is likely to take place.

My invention attains the above objective by connecting the envelope detector 46 to one of the inputs of the comparator circuit 47 and by connecting the reference voltage source 48 to the other input of the comparator circuit. The comparator circuit 47 constantly compares the output voltage of the envelope detector 46 against the reference voltage representative of the degree of record disc displacement at or beyond which the pseudofocused condition may take place. When the output voltage of the envelope detector 46 becomes less than the reference voltage, the comparator circuit 47 delivers the switch actuator signal to the cutoff switch 45.

Thereupon the cutoff switch 45 opens to suspend the delivery of the focus control signal from the focus control circuit 41 to the drive coil 35 of the objective assembly 36. The cutoff switch thus sets the objective 31 out of control in response to the actual or impending pseudofocused condition. But this out-of-control state does not continue indefinitely. The output voltage of the envelope detector 46 will rise to or past the reference voltage when the degree of record disc displacement returns to the normal range. Thereupon the comparator circuit 47 will automatically reclose the cutoff switch 45 thereby permitting the focus control circuit 41 to resume the delivery of the focus control signal to the drive coil 35.

With the objective 31 thus automatically kept focused on the record disc in accordance with my invention, the disc player of FIGS. 1 and 5 operates in the well known manner to reproduce the video or audio information recorded on the disc 21. Since the reflected laser beam falling on the photodetector assembly 34 has been modulated by the pattern of pits 50 on the record disc, the electrical outputs from the photodetector assembly contains the desired information. This particular embodiment delivers the information from the second photodetector element 39 to the unshown demodulator circuit via the readout line 49 connected to the output of the second amplifier 43.

It is therefore clear that my invention requires no beam, other than the readout beam, for exclusive use for focus control. This helps to materially simplify the optical system of the disc player.

SECOND FORM

Figure 11:
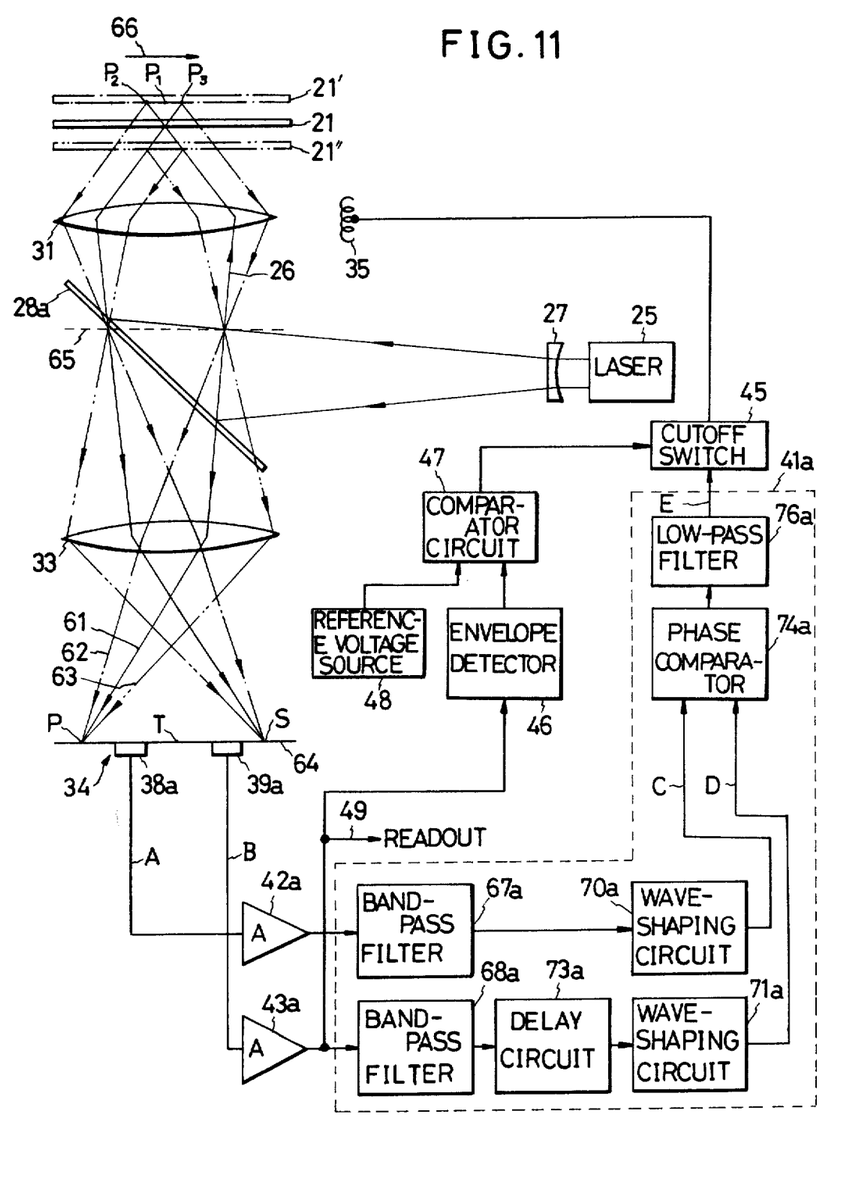
FIG. 11 is a diagrammatic representation, partly in block form, of a modified focus control system in accordance with my invention for use in the apparatus of the type shown in FIG. 1, the optical pickup assembly in this representation being also shown simplified to clearly illustrate the operation of the modified focus control system with the various distances between record disc and objective.

FIG. 11 illustrates another example of disc player embodying my invention. Some parts or components of this alternative embodiment have their counterparts in the embodiment of FIGS. 1 and 5. Such corresponding parts will be identified by like reference characters and will not be described in any detail.

The disc player of FIG. 11 features two photodetector elements 38a and 39a forming a photodetector assembly 34a, in contrast to three such elements 38, 39 and 40 forming the photodetector assembly 34 in the preceding embodiment. Lying on the common plane 64 in conjugate relationship to the focal plane 65 of the objective 31, the two photodetector elements 38a and 39a are connected via respective amplifiers 42a and 43a to a focus control circuit 41a. This focus control circuit has been modified as in the following to conform to the two photodetector elements 38a and 39a in use.

The modified focus control circuit 41a comprises first 67a and second 68a band-pass filters connected to the outputs of the respective amplifiers 42a and 43a. The first band-pass filter 67a has its output connected directly to a first wave-shaping circuit 70a, whereas the second band-pass filter 68a has its output connected to a second wave-shaping circuit 71a via a time-delay circuit 73a. The two wave-shaping circuits 70a and 71a are connected to the respective inputs of a phase comparator 74a, which has its output connected to a low-pass filter 76a.

As in the preceding embodiment the output of the focus control circuit 41a, or of the low-pass filter 76a, is connected to the drive coil 35 of the objective assembly 36 via the automatic cutoff switch 45. The signal for the actuation of this cutoff switch, as well as the record disc information to be reproduced, is shown to be derived from the amplified output from the second photodetector element 39a.

The time-delay circuit 73a functions to delay the output from the second band-pass filter 68a for a length of time corresponding to 90 electrical degrees with respect to the average frequency of the information signal being processed. Thus, if the outputs from the two photodetector elements 38a and 39a have an average frequency of 10 megahertz, then the time-delay circuit 73a delays the second band-pass filter output for 25 nanoseconds.

The phase comparator 74a of this alternative embodiment takes the form of a product demodulator or detector. This phase comparator produces, therefore, a zero output when the phase difference between its two inputs is 90 degrees, a positive output when the phase difference is less than 90 degrees, and a negative output when the phase difference is more than 90 degrees.

OPERATION OF THE SECOND FORM

Figure 12A:
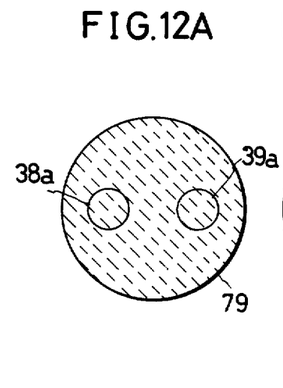
FIG. 12A is a diagrammatic view of the spot of the information-modulated beam falling on the two coplanar photodetector elements in the modified focus control system of FIG. 11 when the objective is focused on the record disc.
Figure 12B:
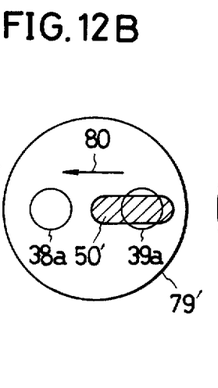
FIG. 12B is a similar view of the spot of the information-modulated beam falling on the photodetector elements in the focus control system of FIG. 11 when the record disc is displaced away from the objective.
Figure 12C:
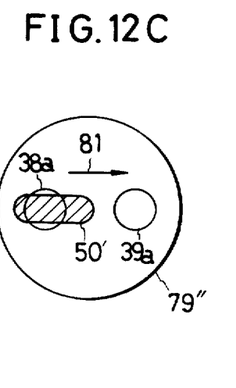
FIG. 12C is a similar view of the spot of the information-modulated beam falling on the photodetector elements in the focus control system of FIG. 11 when the record disc is displaced toward the objective.

FIGS. 12A, 12B and 12C represent the record disc images 79, 79' and 79" formed on the plane 64 of the photodetector elements 38a and 39a by the reflected laser beam when the record disc is in the proper position 21, the distally displaced position 21', and the proximally displaced position 21", respectively. These record disc images 79, 79' and 79" are per se identical with those given in FIGS. 6A, 6B and 6C.

Figure 13:
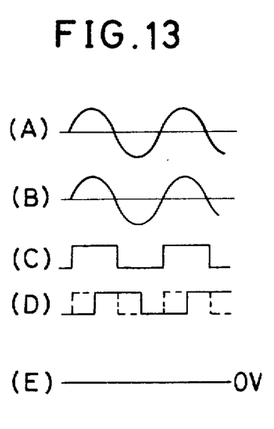
FIG. 13, including 13A–13E, is a chart of waveforms appearing at various stages in the focus control system of FIG. 11 when the objective is focused on the record disc.

When the record disc lies in the proper position 21, with the incident laser beam sharply focused thereon by the objective 31, the reflected laser beam of high or low intensity substantially simultaneously irradiates the two photodetector elements 38a and 39a as in FIG. 12A. Consequently the photodetector elements 38a and 39a produce the phased outputs of FIGS. 13A and 13B.

Since the time-delay circuit 73a imposes an approximately 90-degree delay on the output from the second photodetector element 39a, the wave-shaping circuits 70a and 71a deliver the outputs of FIGS. 13C and 13D, 90 degrees out of phase with each other, to the phase comparator 74a. The subsequent low-pass filter 76a produces the focus control signal of zero volt as in FIG. 13E. With the drive coil 35 of the objective assembly 36 thus held unenergized, the objective 31 remains focused on the record disc in its proper position 21.

The delay time imposed on the output from the second photodetector element 39a varies with the change in the frequency of the information signal being read out. Inevitably, therefore, the desired 90-degree phase difference may not be maintained between two inputs to the phase comparator 74a when the record disc lies in its proper position 21. This will present no serious problem in practice. Even though the focus control circuit 41a may energize the drive coil 35 when the record disc is in focus, the objective 31 will nevertheless remain focused on the record disc to an extent necessary for the readout of the information recorded thereon.

Figure 14:
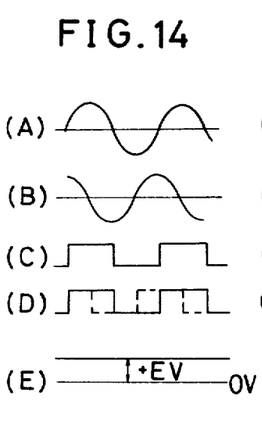
FIG. 14, including 14A–14E, is a chart of waveforms appearing at various stages in the focus control system of FIG. 11 when the record disc is displaced away from the objective.

When the record disc is displaced to the distal position 21', the successive distinct pit images 50' pass over the two photodetector elements 38a and 39a in the direction of the arrow 80 in FIG. 12B. Receiving this record disc image 79', the photodetector elements 38a and 39a produce the outputs of FIGS. 14A and 14B. The output from the second photodetector element 39a has a phase delay of, for example, 90 degrees with respect to the output from the first photodetector element 38a.

Here again the time-delay circuit 73a imposes an approximately 90-degree delay on the output from the second photodetector element 39a, so that the wave-shaping circuits 70a and 71a produce the outputs of FIGS. 14C and 14D. Comparing the phases of these two inputs, the phase comparator 74a delivers the consequent output to the low-pass filter 76a. As represented in FIG. 14E, the low-pass filter 76a produces the focus control signal of, for example, +E volt(s).

The focus control circuit 41a delivers this +E volt focus control signal to the drive coil 35 of the objective assembly 36 via the automatic cutoff switch 45, which is now closed. Thus energized, the drive coil 35 causes the objective 31 to move toward the distally displaced record disc until the former is refocused on the latter.

Figure 15:
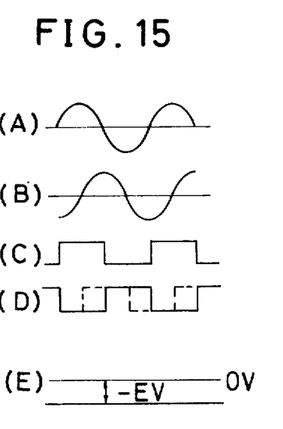
FIG. 15, including 15A–15E, is a chart of waveforms appearing at various stages in the focus control system of FIG. 11 when the record disc is displaced toward the objective.

When the record disc is displaced to the proximal position 21", the successive distinct pit images 50' pass over the two photodetector elements 38a and 39a in the direction of the arrow 81, as in FIG. 12C, which is opposite to the direction 80 of FIG. 12B. This record disc image 79" causes the photodetector elements 38a and 39a to produce the outputs of FIGS. 15A and 15B. The output from the second photodetector element 39a has a phase advance of, for example, 90 degrees with respect to the output from the first photodetector element 38a.

The time-delay circuit 73a delays the output from the second photodetector element 39a approximately 90 degrees, so that the wave-shaping circuits 70a and 71a produce the outputs of FIGS. 15C and 15D. The phase difference between these outputs is such that the low-pass filter 76a produces the focus control signal of −E volt(s) as in FIG. 15E. Delivered to the drive coil 35 of the objective assembly 36 via the closed cutoff switch 45, the −E volt focus control signal causes the coil to move the objective 31 away from the proximally displaced record disc umtil the latter lies in the focus of the former.

It is now clear that the focus control system of FIG. 11 also permits automatic control of the distance between objective and record disc. It will also be understood that the cutoff switch 43 of this focus control system also operates automatically to intercept the delivery of the focus control signal from the focus control circuit 41a to the drive coil 35 when the noted pseudofocused condition occurs or is about to occur.

THIRD FORM

Figure 16:
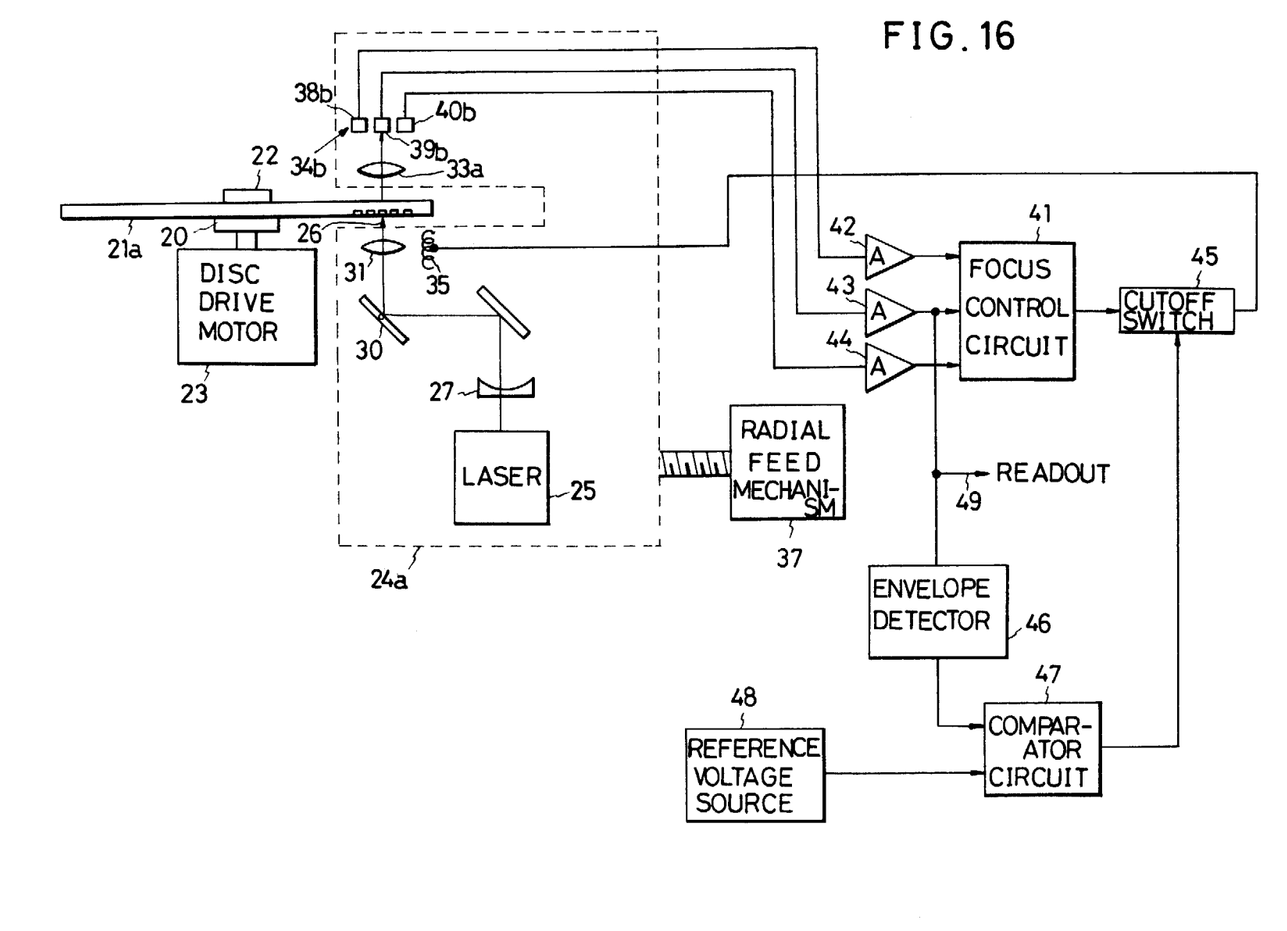
FIG. 16 is a diagrammatic representation, partly in block form, of another example of optical readout apparatus for use with a record disc that transmits the readout beam in modulating same with the information recorded thereon, the apparatus incorporating a correspondingly modified form of the focus control system in accordance with my invention.

FIG. 16 illustrates a third embodiment which manifests the adaptability of my invention for use with a record disc 21a that generally transmits light, with the video or audio information recorded thereon in the form of a succession of nontransmissive regions inscribed along a multiturn spiral track. Essentially this third embodiment is a modification of the system of FIGS. 1 and 5. Most parts or components of this embodiment are therefore identified in FIG. 16 by the same reference characters as those designating their corresponding parts in FIG. 1, and their description will be omitted except where necessary.

The focus control system of FIG. 16 differs from that of FIG. 1 only in the arrangement of some parts within the optical pickup assembly, the modified pickup assembly being designated 24a. The modified pickup assembly 24a includes a converging lens 33a disposed on the side of the record disc 21a opposite to the side where the objective 31 lies. On the same side of the record disc 21a as the converging lens 33a and farther away therefrom, a photodetector assembly 34b is provided which is shown to comprise three photodetector elements 38b, 39b and 40b in a row. The light sensitive surfaces of these photodetector elements are disposed in a common plane corresponding to the plane 64 of FIG. 5. The other details of construction can be identical with those set forth in connection with FIGS. 1 and 5.

In the operation of the disc player of FIG. 16, the laser beam on passing the record disc 21a becomes modulated by the information recorded thereon. The modulated laser beam falls on the photodetector elements 38b, 39b and 40b just as shown in FIGS. 6A, 6B and 6C, depending upon the axial position of the record disc with respect to the objective 31. It is therefore apparent that the focus control system of FIG. 16 operates like the system of FIG. 1 to effect automatic control of the focal distance between record disc and objective.

While I have herein shown and described my invention in terms of what I have considered the preferable embodiments thereof, nevertheless the specialists in this field will readily conceive a variety of modifications or variations to conform to system requirements or design preferences. For instance, if space allows, the photodetector assembly 34, 34a or 34b may be disposed on the focal plane itself of the objective 31, instead of on the plane 64 in conjugate relationship to the focal plane of the objective. The photodetector assembly may further be disposed in locations other than those planes, although additional considerations may become due in this case.

Further, although I have derived the desired video or audio information from the output from one of the elements of the photodetector assembly in the disclosed embodiments, this is not an essential feature of my invention. If desired, the reflected or modulated light beam may be split, as by a half-silvered mirror, into a focus control sub-beam and a readout sub-beam. The focus control sub-beam may then be directed on to the photodetector assembly 34, 34a or 34b, and the readout sub-beam to an additional photodetector element exclusively for the readout of the information.

It will also be seen that the information track on the record carrier may be scanned by various methods other than that disclosed herein. For instance, if the record carrier is in the form of a disc having a spiral information track formed thereon as in the illustrated embodiments, the record disc may be both rotated about its own axis and fed linearly relative to the optical pickup assembly that is held stationary. All that is necessary is that there be a relative scanning motion between the record carrier and the incident beam of light.

Such relativity of motion applies to the adjustment of the distance between objective and record carrier. Instead of moving the objective toward and away from the record carrier as in the illustrated embodiments, the record carrier may be moved toward and away from the objective, the latter being held at least against axial motion in this case.

Further, while the disclosed embodiments presuppose the use of an He-Ne or like laser as the light source, my invention permits the use of other forms of light source, possibly with minor modifications of the optical pickup assembly. A diode laser is an example. This laser may be integrally combined with the objective, and the laser-objective combination may be moved toward and away from the record carrier by means disclosed herein. In this case, moreover, the information may be derived from the changes in the current through the diode laser that have been caused by the laser beam reflected back from the record carrier.

Still further the focus control circuit 41 of FIG. 5 can dispense with the time-delay circuit 73 if the three photodetector elements 38, 39 and 40 are disposed at unequal spacings therebetween, that is, if the second photodetector element 39 is disposed closer to either of the first 38 and third 40 photodetector elements than to the other. It is also possible to substitute a half-silvered mirror for the beam splitter 28 and quarter-wave plate 29 in the optical pickup assembly.

All these and other modifications or variations that will readily occur to the specialists are intended in the foregoing disclosure. It is therefore appropriate that my invention be construed broadly and in a manner consistent with the fair meaning and proper scope of the following claims.

I claim:

1. In apparatus for reading a record carrier on which information is recorded in the form of a succession of optically readable regions disposed along a predetermined track, in combination:
   (a) a light source for emitting a beam of light;
   (b) an objective for focusing the light beam on the record carrier;
   (c) means for creating a relative scanning motion between the record carrier and the light beam so that the light beam follows the predetermined track on the record carrier and so is modulated by the information recorded thereon;
   (d) first, second, and third photodetector elements arranged to be irradiated by the information-modulated light beam and aligned in such a direction that the successive images of the optically readable regions on the record carrier travel thereover, so that the three photodetector elements produce electrical outputs having a phase relationship varying in accordance with the distance between the record carrier and the objective;
   (e) a time-delay circuit, connected to the second photodetector element which is disposed intermediate the first and the third photodetector elements, for delaying the output therefrom for a prescribed length of time;
   (f) a first phase comparator, connected to the first photodetector element and to the time-delay circuit, for producing an output representative of the phase difference between the outputs therefrom;
   (g) a second phase comparator, connected to the time-delay circuit and to the third photodetector element, for producing an output representative of the phase difference between the outputs therefrom;
   (h) a differential amplifier, connected to the first and the second phase comparators, for producing an output representative of the difference in magnitude between the outputs therefrom; and
   (i) means responsive to the output from the differential amplifier for controllably varying the distance between the record carrier and the objective in order to hold the light beam focused on the record carrier.

2. The apparatus as recited in claim 1, wherein the first and the second phase comparators are each in the form of an exclusive OR circuit.

3. The apparatus as recited in claim 1, wherein the first and the second phase comparators are each in the form of a product detector.

4. The apparatus as recited in claim 1, further comprising:
   (a) a cut-off switch connected between the differential amplifier and the means for varying the distance between the record carrier and the objective, the cut-off switch being normally held closed;
   (b) an envelope detector connected to the output of one of the three photodetector elements;
   (c) a reference voltage source for generating a reference voltage corresponding to the magnitude of the output produced by each photodetector element when the distance between the record carrier and the objective increases to a prescribed degree; and
   (d) a comparator circuit, connected to the envelope detector and the reference voltage source, for comparing the output magnitude of the former with the reference voltage and for opening the cut-off switch when the envelope detector output magnitude becomes less than the reference voltage.

5. The apparatus of claim 1 further comprising first and second low pass filters connected to said first and second phase comparators for smoothing the output thereof.

* * * * *